Patented June 21, 1927.

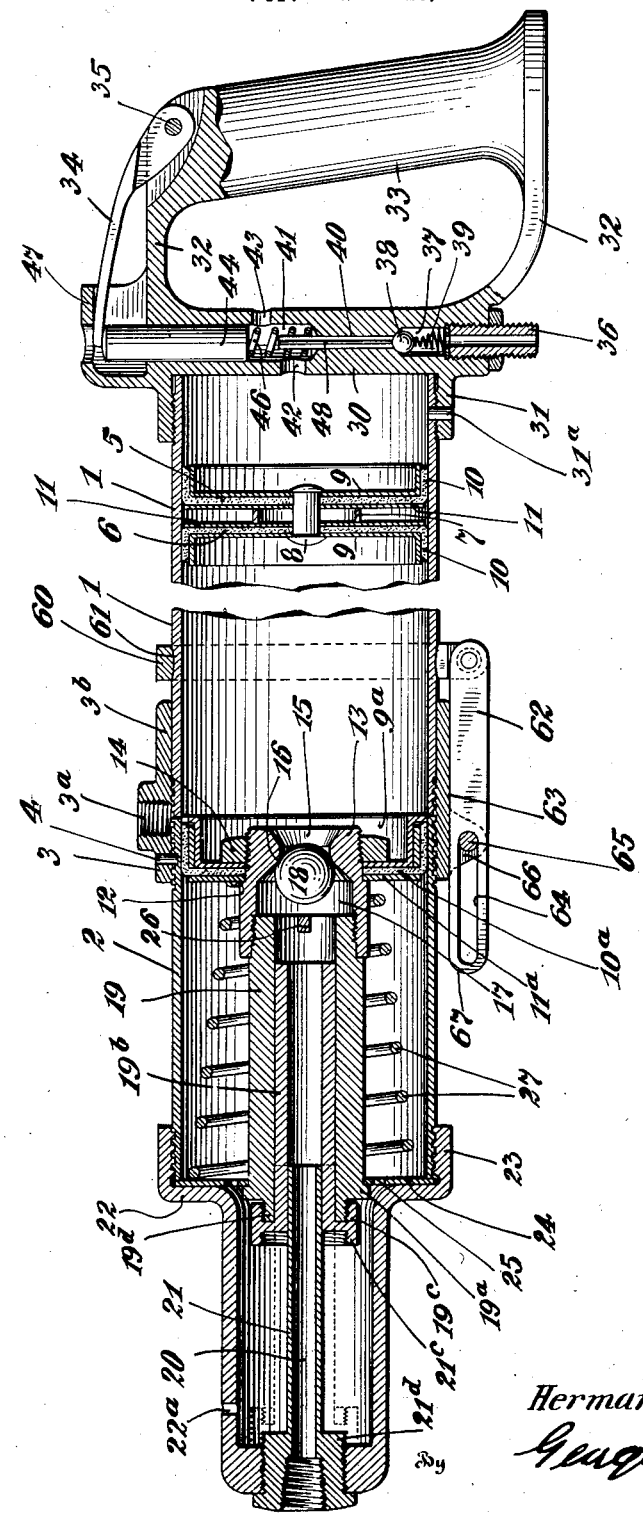

1,633,357

UNITED STATES PATENT OFFICE.

HERMAN ALBERTINE, OF EAST RUTHERFORD, NEW JERSEY, ASSIGNOR TO CHARLES P. ROGERS AND COMPANY (INC.), A CORPORATION OF NEW YORK.

FORCE-FEED LUBRICATING APPARATUS.

Application filed March 18, 1926. Serial No. 95,647.

My present invention relates to apparatus of the type set forth in my application Ser. No. 80,139, filed January 9, 1926, in that it is designed for forcing grease into lubricating ducts of bearings, particularly on automobiles, being equally well adapted for large-quantity, low-pressure feed as for the casings of universal joints, differential gears, etc., and for higher pressure such as is required to force the grease through the valve ducts or nipples used on automobile bearings, and for the still higher pressures that may be necessary where such valves or ducts are stuck or clogged, and it may be useful in many other relations where it is desired to have reservoir feed of fluid against widely different resistances, particularly where the amount of resistance cannot be known until pressure is applied in an effort to overcome it.

The device includes a grease reservoir, pressure means for forcing it through a lubricating outlet passage and means whereby the effective pressure in the passage is automatically multiplied when a resistance to be overcome exceeds a predetermined value. Preferably, the primary pressure is compressed gas, and for ordinary purposes the gas will be air and the source of pressure an ordinary tire filling apparatus such as is in common use in the garage.

The reservoir is preferably a cylinder, in which a body of grease is maintained between two pistons, a primary, double-headed piston, the rear face of which is subjected to the pneumatic pressure and the front face of which applies the pressure to the grease. The secondary piston, enclosing the other end of the body of grease, is normally held in a predetermined position by means of a spring and in such position serves merely as a wall of the reservoir through which grease is forced through the outlet, by the pneumatic pressure of the primary piston. The outlet, however, comprises telescoping members, one of which is fixed and leads to a nozzle for application to the device to be lubricated, and the other of which is carried by said secondary piston. So long as the resistance against which the grease is being forced, is less than the pressure of the spring holding the secondary piston in its normal position, the grease flows out through the piston head and tube carried thereby, into the fixed tube, under the "per square inch pressure" afforded by the air behind the primary piston, but when the resistance becomes sufficient, the pressure piles up and the secondary piston is forced rearwardly against its spring, telescoping over the fixed nozzle tube and displacing grease which naturally tends to flow backward into the reservoir. This back-flow of grease is prevented by a check valve, which automatically closes, whereupon the entire pressure over the flat area of the secondary piston is applied on the small cross-section of grease in the telescoping members. A pressure of, say, 50 pounds per square inch from a tire inflating system applied behind the primary piston will apply a pressure of, say, 250 pounds on a total of, say, five square inch area of the secondary piston, and this 250 pounds pressure applied on a $\frac{1}{10}$th square inch cross-section would give an effective maximum pressure of 2500 pounds to the square inch at the outlet of the grease gun.

When the movable tube telescopes into the fixed tube, as in my prior application, the cross-section of grease contained in the fixed tube is necessarily larger than that of the movable tube, and my present invention contemplates making the movable tube telescope over the fixed tube, so that on the reverse or filling strokes of the movable tube, the inflowing grease is stored in the movable tube instead of having to flow through it into the fixed tube. This reversal renders it more convenient to apply another feature of my invention, which is supplying an intermediate tube member which can be attached to the movable tube as a liner, sliding on the fixed tube, or can be made rigid with the fixed tube, whereby the volume of the movable tube may be increased and the effective pressure correlatively decreased, or vice versa.

Another improvement over the arrangement shown in my prior application is removing the coupling collar from the inside of the reservoir to the outside of the reservoir, thus making it possible for the secondary piston to have a normal piston flush with its section of the reservoir, Another feature is having the two sections of the reservoir cylinder connected by a link and swivel, the link having a guide surface parallel with the axis of the sections so that the latter cannot be approached except in proper alignment for accurate screwing together.

Another feature is an improved trigger arrangement for controlling supply of compressed air, including a guard whereby the compressed air is less likely to get turned on accidentally.

It is evident that the source may supply a much higher pneumatic pressure than that indicated above; also that the term "pneumatic" is intended to include pressure of gases other than air as, for instance, the high pressures available from containers for liquid carbon dioxide; also that the lubricating material referred to as "grease" may be any lubricant, including relatively thin oils as well as the hardest or stickiest greases used for lubrication.

The above and other features of my invention will be more evident from the accompanying drawing, in which The figure is a longitudinal section through the axis of the complete device, the handle and movable parts of the valving mechanism being shown in elevation.

The reservoir is shown as a cylinder comprising two sections, 1, 2, of any desired diameter, preferably the same diameter, detachably secured as by an external sleeve, 3, threaded to adjacent ends of the sections and secured to one of them, preferably section 2, as by pin rivet, 4.

In section 1, there is a double-headed piston comprising the head, 5, adapted to sustain the actuating air pressure and a head, 6, facing the opposite way, to apply said pressure to the grease. These heads are spaced apart a distance sufficient to prevent tendency to cock in the cylinder by a spacer cylinder, 7, with the end of which they are tightly engaged by a rivet, 8. This rivet is double-headed and serves also to secure together the parts of the two piston heads which each comprise, a metal cup, 9, cup washer, 10, preferably of leather, and a disc, 11, whereby the cup leather is clamped against a cup, 9.

It will be understood that the cylinder section, 1, may be as long as desired and that this is filled with grease by unscrewing it from the collar, 3, and filling it through the open end.

Section 2 contains the secondary piston, faced toward the grease and of the same construction as the heads in section 1, except that the cup, $9^a$, cup leather, $10^a$, and disc, $11^a$, are clamped together between a flange, 12, integral with a tubular nipple, 13, and a nut, 14, screwed on the exterior of said nipple.

This nipple has the grease inlet, 15, formed with a valve seat, 16, leading to a valve chamber, 17, containing a ball valve, 18. The outlet of this chamber is through a tube, 19, telescoping over a cylindrical outlet passage, 20, in the nozzle, 21, carried by the head, 22, closing the outer end of cylinder, 2, the securing means including a screw-threaded flange, 23, engaging the exterior of the cylinder and clamping a disc, 24, engaging the end of the cylinder and provided with breather holes, 25; this disc serves as a stop for annular flange, $19^a$, on tube, 19, whereby the secondary piston has its free edge gauged flush with the end of cylinder section, 2.

In the form shown, tube 19 is screw-threaded into the valve chamber, 13, and is provided with a cross-bar, 26, whereby the ball, 18, is prevented from ever closing the outlet through tube 19. A spring 27, seated against the inner face of disc, 24, encircles tube 19 and bears against the rear of piston disc, $11^a$. This spring forces the secondary piston to a predetermined normal position, in which the flange $19^a$ bears firmly upon the disc, 24.

It is evident that as against all pressures, up to the limit of the power of spring, 27, the cup, $9^a$, of the secondary piston is a fixed wall of the grease containing chamber, the oppositely directed cup, 9, of the primary piston being a cooperating movable wall for said chamber. Consequently, when the primary cup, 9, is forced against the grease, the cup, $9^a$, remaining stationary, the ball, 18, will be forced back into the valve chamber, 17, but will be prevented from closing the outlet, by engagement with cross-bar 26. In this situation, and as against moderate resistance, grease will be forced out through tube, 19, into tubular passage, 20, in the nozzle and thence out through the end of the nozzle. But whenever pressure is applied on the grease in excess of what the spring 27 can withstand, as will naturally be necessary whenever the resistance and back pressure on the nozzle becomes sufficiently great, the secondary piston will compress the spring, moving rearwardly and carrying with it the tube 19. The back-pressure of the grease will immediately carry the ball to the position shown in the figure, where it blocks back flow escape of grease into the cylinder. The grease in 19, 20, being thus confined, 19 becomes an independent reservoir subjected to all of the pressure applied over the entire area of the secondary piston, $9^a$.

In the above, no account has been taken of the liner, $19^b$, for the reason that in the position shown it is functionally a part of said tube, 19, being immovably secured thereto by screw flange, $19^c$, engaging screw nipple, $19^d$. If, however, larger capacity is desired in tube 19, with correspondingly decreased nozzle pressure, the liner will be unscrewed from tube 19 and its other screw-thread flange, 21°, will be screwed onto screw-thread, 21ᵈ, and the latter being integral to a stationary tube 21, the liner thus becomes functionally an integral part of said tube 21.

In the proportions shown in the drawing, the internal diameter of the tube 19 is about twice the internal diameter of the liner 19ᵇ. Consequently, transfer of liner 19ᵇ from forming an essential part of tube 19, to forming an essential part of tube 21 has the effect of multiplying by four the capacity of the movable cylinder and also of multiplying by four the area of the end of the fixed piston. If the power applied by the compressed air, through the grease in the reservoir, to the secondary piston is a fixed amount which, as explained above, may be, say, 250 pounds, applying this pressure over a fixed piston of four times the area makes the pressure available on the outlet portion 20, approximately one-fourth what it was before. The lesser pressure available with the liner secured to the outlet tube may be entirely sufficient for blowing open all ordinary clogged ducts, in which case the user will naturally keep the liner secured in the dotted line position, where it forms part of the fixed tube, but whenever extraordinary resistance is encountered it is a very simple matter to unscrew the end closure and transfer the liner back to the position shown in full lines.

The cylinder section, 2, containing this power multiplying part of the apparatus, preferably has permanently secured to it the above described coupling collar, 3. This collar is preferably provided with a filler opening, 3ᵃ, in which may be screwed the outlet nozzle of any suitable reservoir of grease under pressure, for refilling cylinder section 1, when it has been emptied and the double-headed piston has been forced to the extremest position in contact with the secondary piston. In order to permit such filling, it is only necessary to unscrew section 1, two or three turns, whereupon the grease will flow in under pressure, driving the primary piston backward toward the air inlet until the filling is completed.

As a pressure reservoir may not be available for filling as above described, the section 1 is made so that it can be completely unscrewed for filling through the open end by hand. To facilitate accurate replacement, I preferably provide the collar, 3, with an extension, 3ᵇ, which has a smooth intake surface for ensuring proper alignment before engagement of the screw threads. As careless withdrawal or insertion of the cylinder 1 within this guide portion may result in angular wrenching or marring of the free edge of the cylinder, I provide special means whereby the free edge is maintained in axial alignment, said means also serving to permanently connect the two cylinder sections even when they are unscrewed. This means includes a split collar, 60, engaging a shallow groove, 61, in the exterior of cylinder section 1, and clamping between the split ends thereof, a link, 62, which has a long straight bearing on a guide surface, 63, on the coupling collar, 3, 3ᵇ, said surface being parallel with the axis of the reservoir. This link has a slot, 64, sliding on a pin, 65, between ears, 66, on the coupling collar. The end, 67, of the link, is formed on an arc of the circle to permit swinging of the link on pivot, 65, only when the link has been withdrawn to the extreme limit permitted by the slot. The length of the slot is such that this withdrawal will bring the free edge of cylinder 1 clear of the guide 3ᵇ.

The means for applying and controlling the primary pressure is in the end closure for cylinder section 1. This closure comprises an end wall, 30, having an internally threaded flange, 31, prevented from unscrewing as by pin rivet, 31ᵃ. It is preferably provided with integral extensions, 32, 32, supporting a handgrasp, 33, and a lever, 34, for controlling inlet and outlet of pneumatic pressure, in position for engagement by the thumb of an operator grasping handle 33. The lever, 34, is pivoted in a slot, 35, near the upper end of handle 33, and its face end extends under a guard, 47, mounted on the end closure, 30. The latter has screw-threaded therein a nipple, 36, for connection to any suitable source of pneumatic pressure. This nipple supplies air to valve chamber, 37, containing ball valve, 38, normally held closed by spring, 39. This valve controls a passage, 40, leading to a cylindrical chamber, 41, which has a port, 42, through which the air pressure may be applied within the cylinder, 1, behind the primary piston. It also has a vent outlet, 43.

The chamber, 41, has a piston plunger, 44, having its outer end laterally engaged with the free end of operating lever, 34, by pressure of spring, 46. The front face of this plunger is normally held just clear of the vent outlet, 43, by the lever, 34, the outward movement of the latter being limited by the guard, 47. When the lever, 34, is depressed against the pressure of spring, 46, the plunger moves inward, closing the outlet, 43, and thereafter it will contact with the end of a channel bar, 48, which extends down through passage, 40, into engagement with the inlet ball valve, 38. In this position, the operator will feel the sudden though slight increase of resistance, due to the pressure of spring, 39, and the air pressure on the ball, and the distance of plunger movement between vent closure and compressed air inlet makes possible a most delicate control of increase and decrease of pressure on the primary piston; that is to say, the distance between vent closure and inlet opening positions of the plunger permits admitting a desired amount of compressed air and then closing the inlet without opening the outlet, and thereafter the outlet may be regulably opened to decrease the pressure to a desired extent without opening the inlet.

A breather opening, 22$^a$, may be provided in the other end of the device to maintain atmospheric pressure on the rear surface of the secondary piston during times when it pushes back under excess pressure and resistance or returns to normal position shown in the drawing, when such pressure is relieved.

I claim:

1. A grease gun, including a force pump having piston and cylinder elements, means for reciprocating the cylinder element with respect to the piston element and means for feeding grease into said pump, said piston and cylinder elements including an element of substantial cross-sectional area with one surface fitting and slidable along a corresponding surface of the piston element and another surface fitting and slidable along a corresponding surface of the cylinder element whereby it may be utilized to vary the cross-section of the piston element or cylinder element.

2. A grease gun, including a force pump having piston and cylinder elements, means for reciprocating the cylinder element with respect to the piston element and means for feeding grease into said pump, said piston having a substantial portion of its effective cross-sectional area afforded by a slidable element provided with means whereby it may be secured to or detached from the piston element.

3. A grease gun, including a force pump having piston and cylinder elements, means for reciprocating the cylinder element with respect to the piston element and means for feeding grease into said pump, said piston having a substantial portion of its effective cross-sectional area afforded by a slidable element provided with means whereby it may be secured for relative movement with the piston element or with the cylinder element.

4. A grease gun, including a force pump having piston and cylinder elements, means for reciprocating the cylinder element with respect to the piston element and means for feeding grease into said pump, said piston and cylinder elements including an element of substantial cross-sectional area, fitting and axially slidable on the exterior of the piston element and also fitting and axially slidable within the cylinder element whereby it may be utilized to function as effective cross-sectional area, either with the piston element or with the cylinder element.

5. A grease gun, including a grease reservoir, an outlet and means for forcing the grease towards said outlet, a movable piston of relatively large area between the grease and the gun outlet, and subject to pressure exerted on said grease, means normally sustaining said piston against the pressure of the grease under the moderate pressures required to force feed the grease against ordinary working resistances but adapted to yield when greater pressures are applied against greater resistances, in combination with relatively small area telescoping tubes constituting piston and cylinder elements of a force pump, one carried by and communicating with the pressure side of the larger piston and the other rigidly connected to and discharging grease through the grease gun outlet, a third tubular element between the piston and cylinder elements of said force pump and attachable to either one of them, and an inlet valve adapted to be opened and permit flow of grease through the pump under the primary pressure when the piston is sustained against said pressure and adapted to close and prevent reverse flow of grease into the reservoir, when said piston yields.

6. A grease gun, including a grease reservoir, an outlet and means for forcing the grease therein towards said outlet, a movable piston of relatively large area between the grease and the gun outlet, and subject to pressure exerted on said grease, means normally tending to sustain said piston against the pressure of the grease under the moderate pressures required to force feed the grease against ordinary working resistances but adapted to yield when greater pressures are applied against greater resistances, in combination with a passage from the pressure side of said piston to the grease gun outlet, including relatively small area piston and cylinder pump elements, one carried by and communicating with the pressure side of the larger piston and the other rigidly connected to and discharging grease through the grease gun outlet, and a third relatively movable element attachable to form part of the effective piston area or detachable to decrease said area; said passage being provided with an inlet valve adapted to open and permit through flow of grease under the primary pressure when the larger piston is sustained against said pressure and closing to prevent reverse flow of grease into the reservoir, when said piston yields and causes a forcing stroke of the pump element carried thereby.

7. A grease gun, including a grease reservoir, an outlet and means for forcing grease towards said outlet, a movable piston element of relatively large area against which pressure on said grease is exerted, and means normally operating to sustain said piston against the pressure of said grease, in combination with a relatively small area force pump including secondary piston, cylinder and valve elements affording a normally open inlet and an outlet through which grease may be forced to the gun outlet under the primary pressure, the secondary pump elements including a slidable element adapted for attachment to function either as piston element or cylinder element, all arranged and operating so that in either case the inlet is closed and a forcing stroke of said pump is actuated by said primary piston element whenever it yields under the primary pressure.

8. A grease gun, comprising a cylindrical reservoir, open at one end for charging with grease and having a closure at the other end affording means for applying air pressure, a double-headed piston having one face exposed to said pressure and the other adapted to apply said pressure to the grease, in combination with a detachable closure for the open end of said reservoir, including a cylinder having its adjacent open end normally closed by a piston normally thrust forward against said pressure by a spring and positively positioned in opposition to said spring by a one-way stop, said piston having a grease outlet therethrough provided with a check valve adapted to open and pass grease from the reservoir when the pressure differential is outward, or to close and prevent backflow of grease when the pressure reverses, together with telescoping pump members, the outer one carried by the piston and supplied with grease therethrough, and the other communicating with the gun outlet.

9. A grease gun, comprising a cylindrical reservoir open at one end for charging with grease and having a closure at the other end affording means for applying air pressure, a double-headed piston having one face exposed to said pressure and the other adapted to apply said pressure to the grease, in combination with a detachable closure for the open end of said reservoir, including a cylinder having its adjacent open end normally closed by a piston normally thrust forward against said pressure by a spring and positively positioned in opposition to said spring by a one-way stop, said piston having a grease outlet therethrough provided with a check valve adapted to open and pass grease from the reservoir when the pressure differential is outward, or to close and prevent backflow of grease when the pressure reverses.

10. A grease gun, comprising a cylindrical reservoir open at one end for charging with grease and having a closure at the other end affording means for applying air pressure, a double-headed piston having one face exposed to said pressure and the other adapted to apply said pressure to the grease, in combination with a detachable closure for the open end of said reservoir, including a cylinder having its adjacent open end normally closed by a piston normally thrust forward against said pressure by a spring and positively positioned in opposition to said spring by a one-way stop, together with telescoping pump members, the outer one carried by the piston and supplied with grease therethrough and the other communicating with the gun outlet.

11. A grease gun, comprising a cylindrical reservoir section adapted to contain grease, a cylindrical pump section having a primary piston adapted to close in the open end of the reservoir section, means for applying pressure on said grease and means for yieldably sustaining said piston against said pressure, in combination with a plunger pump, one element of which is carried by said piston and the other element of which is a fixed tubular member provided with an outlet through which grease is forced, and slidable detent means for positioning said piston substantially flush with the reservoir end of said pump section.

12. A grease gun, comprising a cylindrical reservoir section adapted to contain grease, a cylindrical pump section having a primary piston adapted to close in the open end of the reservoir section, an exterior coupling collar, internally screw-threaded to hold said sections in alignment, means for applying pressure on said grease and means for yieldably sustaining said piston against said pressure, in combination with a plunger pump, one element of which is carried by said piston and the other element of which is a fixed tubular member provided with an outlet through which grease is forced, one of said sections being provided with a swivel collar connected with said coupling collar by a slotted link having a bearing on said coupling collar substantially parallel with the axis of the device.

13. A grease gun comprising a cylindrical reservoir section, with cylindrical closure section and an exterior collar whereby said sections are secured in alignment, in combination with a collar swiveled on one of said sections, permanently secured to the other section by a slotted link engaging a pin on the other section, the parts having cooperating guide surfaces parallel with the axis of the reservoir whereby the sections must be axially separated before permitting angular movement to expose the open end of the reservoir.

14. A grease gun comprising a cylindrical reservoir and a screw closure therefor secured by an internally screw-threaded collar, said collar having an inlet passage registering with the screw-threaded end of said reservoir, whereby grease may be forced into the reservoir upon slight unscrewing thereof from its closure, said reservoir being provided also with a vent which may be opened to permit escape of air during the charging operation.

Signed at New York, in the county of New York, and State of New York, this 17th day of March, A. D. 1926.

HERMAN ALBERTINE.